(12) United States Patent
Borntraeger et al.

(10) Patent No.: US 8,332,594 B2
(45) Date of Patent: Dec. 11, 2012

(54) MEMORY MANAGEMENT COMPUTER

(75) Inventors: Christian Borntraeger, Stuttgart (DE);
Christian Ehrhardt, Holzgerlingen (DE); Carsten Otte, Stuttgart (DE);
Martin Schwidefsky, Böblingen (DE);
Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 12/824,297

(22) Filed: Jun. 28, 2010

(65) Prior Publication Data

US 2011/0320681 A1   Dec. 29, 2011

(51) Int. Cl.
*G06F 12/00*   (2006.01)

(52) U.S. Cl. ..................... 711/147; 711/154

(58) Field of Classification Search ............... 711/147, 711/148, 156
See application file for complete search history.

(56) References Cited

U.S. PATENT DOCUMENTS 7,506,095 B2   3/2009 Otte et al.
2006/0150153 A1   7/2006 Altman

OTHER PUBLICATIONS

Carl A. Waldspurger, Memory Resource Management in VMware ESX Server, OSDI, Dec. 2002, pp. 1-14, Palo Alto, CA, US.

*Primary Examiner* — John Lane
(74) *Attorney, Agent, or Firm* — Cantor Colburn LLP; Steven Chiu

(57) ABSTRACT

Memory management of processing systems running in a virtual computer environment and of processes running in an operating system environment includes identifying a usage pattern of a page in memory. The usage pattern is identified by tracking operations conducted with respect to the page. The memory management also includes designating the page as a candidate for sharing when the usage pattern reflects that a number of updates made to the page does not exceed a predefined threshold value. The candidate page is allocated to a first process or virtual machine. The memory management also includes sharing access to the candidate page with a second process or virtual machine when content in the candidate page matches content of page allocated for the second process or virtual machine to an address space of the candidate page.

21 Claims, 7 Drawing Sheets

MEMORY MANAGEMENT COMPUTER

BACKGROUND

The present disclosure relates generally to memory management of processing systems and, in particular, to memory management of processing systems running in a virtual computer environment and/or processes running in an operating system environment.

Computer systems contain non-volatile mass storage devices (e.g., hard disk drives) to hold program and data files. The contents of these files are loaded into a Random Access Memory (RAM)-type system memory in order to be accessed or executed by a computer processing unit (CPU) of the computer system. This loading operation is typically performed by an operating system (OS) on behalf of application programs. Where the computer system employs processors running virtual machines, these loading operations may be facilitated through the use of virtual memory and demand paging functions. In a virtual machine environment, applications do not directly use system memory addresses to designate the code and data they use; rather, the applications use "virtual addresses" to designate memory locations, which are translated into system memory addresses by a paging mechanism implemented by CPU circuits under the control of the OS. This allows the OS to avoid having to load program and data files in their entirety into RAM. Instead, system memory is divided into segments, or "chunks" of a particular size (referred to as "pages"), and the OS loads the corresponding segment of file contents into each memory page only at the time this specific page is accessed. There are several variants of this method, such as fault-ahead (load accessed pages AND nearby-pages that are expected to be used in the future). In general, these implementations are referred to as "demand paging."

One disadvantage of the above is that RAM is typically required to hold the contents of programs and data files, thereby reducing the amount of RAM available for other purposes, and also requires some time to download the contents into RAM. Virtualization techniques have been developed that enhance the memory management but also impose additional challenges. Virtualization may be implemented by a software program, often referred to as a "hypervisor" or "virtual machine manager," which runs on a single computer system but allows multiple "guest" operating systems to run concurrently, each in a separate "virtual machine." Accesses to these virtual components are intercepted by the hypervisor and translated into accesses to real components. This allows the use of demand paging on the guest operating system memory (e.g., guests can have more memory than is physically available and is referred to as memory over-commitment). However, if the same program or data is concurrently accessed by multiple guests running under the same hypervisor, each guest operating system will separately allocate virtual RAM to hold these contents, and the hypervisor may then need to allocate multiple identical copies of the contents in physical RAM.

Techniques, such as execute in place with shared memory, have been developed to avoid the allocation of multiple identical copies. Sharable pages are put in a shared memory zone and every memory access is diverted to the shared memory. This technology involves a complex setup and is lacks the ability to transparently handle system updates. As a result, this technology can only be used in a limited amount of use cases.

Techniques, such as content-based page sharing, have been developed to minimize the allocation of multiple identical copies of contents into physical RAM. Using a scanning feature, page copies are scanned and identified by their contents. Pages with identical contents can be shared with other resources without duplication. However, the scanning process to identify sharing opportunities is time consuming and prohibitively expensive to employ.

What is needed, therefore, is a way to identify storage pages with the same content for user programs and/or virtual machines while minimizing the amount of CPU power and memory bandwidth typically required using other techniques, such as page scanning.

SUMMARY

Embodiments of the invention include a method for memory management of processors running in a virtual computer environment and/or processes running in an operating system environment. The method includes identifying a usage pattern of a page in memory. The usage pattern is identified by tracking operations conducted with respect to the page. The memory management also includes designating the page as a candidate for sharing when the usage pattern reflects that a number of updates made to the page does not exceed a predefined threshold value. The candidate page is allocated to a first process or virtual machine. The memory management also includes sharing access to the candidate page with a second process or a second virtual machine when content in the candidate page matches content of page allocated for the second process or second virtual machine to an address space of the candidate page.

Additional embodiments include a system for memory management of processors running in a virtual computer environment and/or processes running in an operating system environment. The system includes a computer processor and logic executing on the computer processor. The logic implements a method. The method includes management of processing systems running in a virtual computer environment includes identifying a usage pattern of a page in memory. The usage pattern is identified by tracking operations conducted with respect to the page. The memory management also includes designating the page as a candidate for sharing when the usage pattern reflects that a number of updates made to the page does not exceed a predefined threshold value. The candidate page is allocated to a first process or a first virtual machine. The memory management also includes sharing access to the candidate page with the second process or second virtual machine when content in the candidate page matches content of page allocated for the second process or second virtual machine to an address space of the candidate page.

Further embodiments include a computer program product for memory management of processors running in a virtual computer environment and/or processes running in an operating system environment. The computer program product comprising a computer-readable storage medium having computer program code embodied thereon, which when executed by a computer, causes the computer to implement a method. The method includes management of processing systems running in a virtual computer environment includes identifying a usage pattern of a page in memory. The usage pattern is identified by tracking operations conducted with respect to the page. The memory management also includes designating the page as a candidate for sharing when the usage pattern reflects that a number of updates made to the page does not exceed a predefined threshold value. The candidate page is allocated to a first process or a first virtual machine. The memory management also includes sharing access to the candidate page with the second process or second virtual machine when content in the candidate page matches content of page allocated for the second process or second virtual machine to an address space of the candidate page.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION

Exemplary embodiments include memory management of processors running in a virtual computer environment. The memory management processes provide a way to conserve processing power and memory bandwidth in a virtual computer environment using a classification scheme that identifies pages suitable for sharing among concurrently running virtual computers (e.g., virtual machines and/or processes) while minimizing the amount of searches of pages that are typically compared for matching content, and enabling the virtual computers to share pages according to the classification scheme. The exemplary memory management processes generate a unique fingerprint for candidate pages, gain a semantic knowledge from usage patterns of the pages (in which the semantic knowledge is distinct from the knowledge of the page content), categorize the pages according to a classification scheme derived from the semantic knowledge, and use the classification scheme to determine which of the pages are suitable for sharing among virtual computers. The suitability analysis may apply factors that are known to affect the overall function of the virtual computer environment in terms of processing capabilities and bandwidth requirements.

For example, suitability factors may include a current status of a page in memory (e.g., the amount and frequency of changes made for a given page with respect to a defined elapsed time; the page has been, or is in the process of being cleared from virtual memory; the page has exceeded a threshold number of changes and/or rates of change with respect to a pre-defined elapsed time). Since the frequency of page changes and/or rates of page changes would require more frequent comparisons in order to determine if these pages have a similar or common history with others, they would not likely be good candidates for sharing. The memory management processes provide a way to reduce the number of such comparisons, as described herein.

Memory page usage may be classified as two types: memory pages representing static content, and memory pages changed frequently by applications. The first type may comprise a representation of a file loaded into memory in which changes are rarely or never made after the initial page load (e.g., loading the same kernel or application binaries). Due to their static nature, this type of page usage may be considered ideal for sharing. The second type of page usage is typically anonymous memory (without backing), e.g., a java heap. This type of memory usage changes frequently so sharing these pages may be costly while providing little if no benefit.

Figure 1:
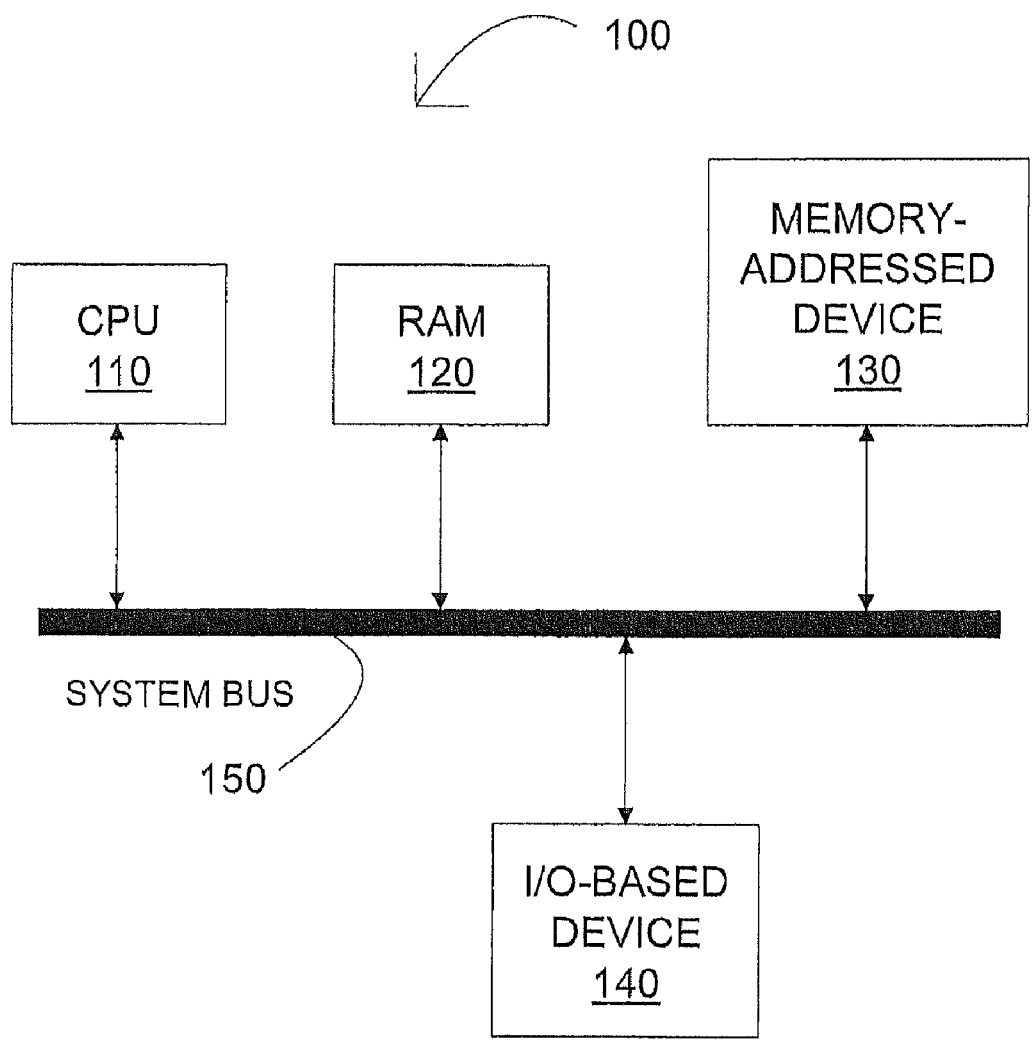
FIG. 1 is a block diagram depicting a computer system for implementing memory management processes in exemplary embodiments.
Figure 2:
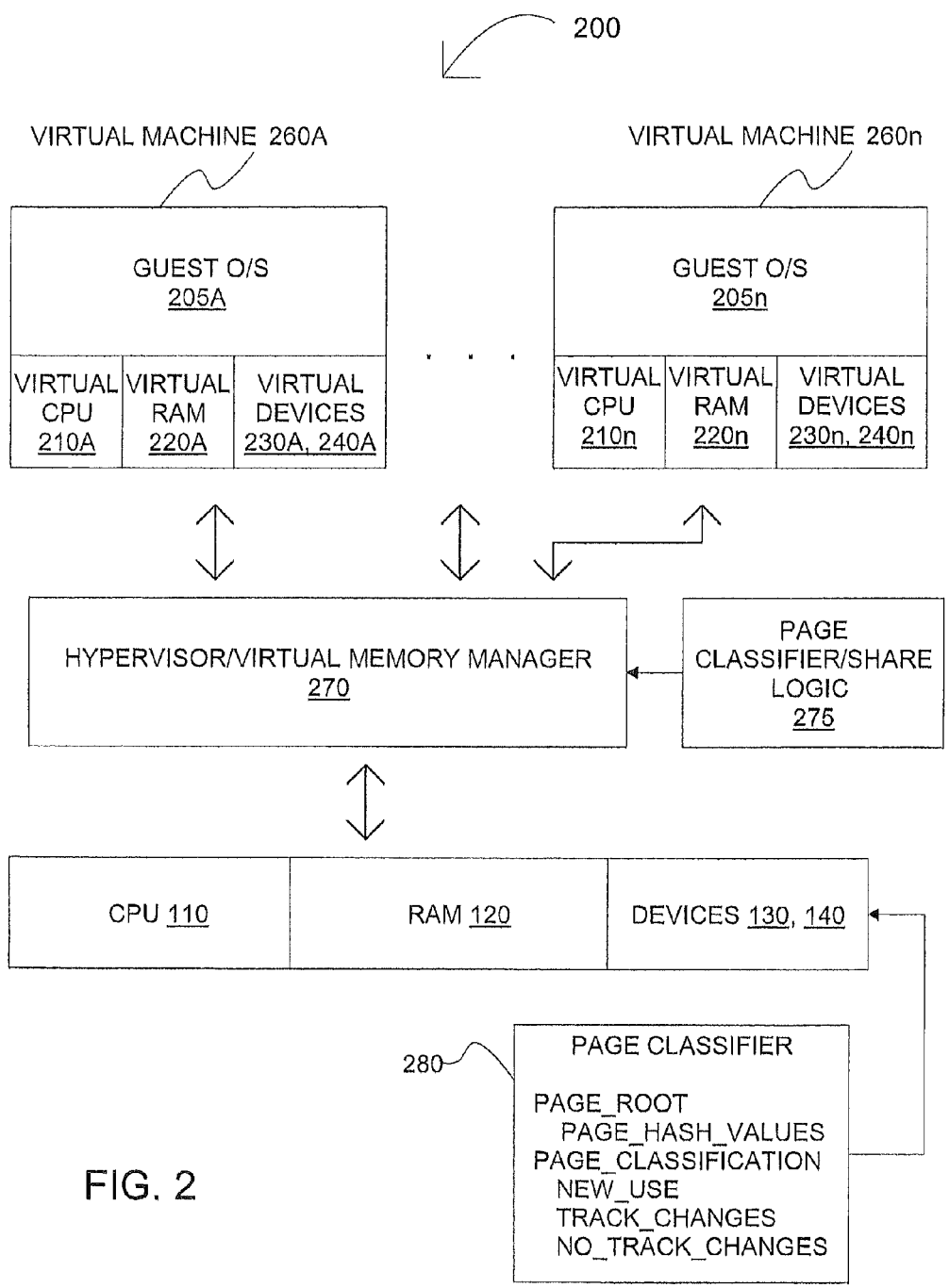
FIG. 2 is a block diagram illustrating a computer system operating in a virtual computer environment in exemplary embodiments.

Turning now to FIGS. 1 and 2, computer systems 100 and 200 upon which memory management processes may be implemented in accordance with exemplary embodiments will now be described. The computer system 100 of FIG. 1 illustrates various physical components of a computer implementing virtual memory, and the computer system 200 of FIG. 2 illustrates operation of these physical components in a virtual machine environment. For example, the computer system 100 of FIG. 1 implements virtual memory (e.g., through address translation and paging) that is used by applications (processes) running under an operating system, while the computer system 200 implements virtual memory in conjunction with virtual machines as "guests" of the virtual machine hosting environment. The computer systems 100 and 200 may each be a personal computer, a mainframe computer, or any other type of computer or data processing system. Computer system 200 may also be configured to operate as one or more virtual machines (VMs) provided by a hypervisor, or virtual machine manager (VMM), which VMs share resources of the computer system and, as part of a virtual machine environment, is depicted as computer system 200 in FIG. 2.

As indicated above, computer systems 100 and 200 include physical components and devices, such as a central processing unit ("CPU") 110, random access memory ("RAM") 120, a memory-addressed device 130, and an input/output (I/O)-based device 140. In one embodiment, memory-addressed device 130 may be a flash memory card. In other embodiments, memory addressed device 130 may be any device that can be directly accessed by CPU 110 for performing memory operations. In one embodiment, I/O-based device 140 may be a hard disk drive. In other embodiments, I/O-based device 140 may be any device that allows data to be copied to and from RAM 120 using I/O operations. While shown in FIGS. 1 and 2 as comprising a single instance of a memory-addressed device 130 and I/O-based device 140, it will be understood that multiple instances of memory-addressed device 130 and/or I/O-based device 140 may be included in the computer systems 100 and 200.

The CPU 110, RAM 120, and devices 130 and 140 may each be coupled to a system bus 150 (shown in FIG. 1). CPU 110 may directly access RAM 120 and memory-addressed device 130 for performing memory operations. I/O-based device 140 may not be directly accessible by CPU 110 for memory operations; however, data may be copied from device 140 to RAM 120 and vice versa using various I/O operations. Each of the computer systems 100 and 200 executes an operating system that manages and regulates access by application programs to various resources (e.g., CPU 110, RAM 120, and devices 130 and 140) of computer systems 100 and 200.

As shown in FIG. 2, the computer system 200 is configured to operate in a virtual machine environment emulated via an interface (e.g., a hypervisor 270) running on the computer system 200. The computer system 200 components may be partitioned to form virtual machines (e.g., virtual machines 260A-260n), each of which comprises a guest operating system (guest operating systems 205A-205n) (also referred to herein as "guests"), virtual CPUs (e.g., virtual CPUs 210A-210n), virtual RAM (e.g., virtual RAM 220A-220n), and virtual devices (e.g., virtual devices 230A-230n).

Operations of the virtual machines 260A-260n are governed by hypervisor 270 which, in turn, may be implemented as hardware (e.g., logic circuits executable by the CPU 110), software (e.g., an interface application layered on top of a hardware layer of the computer system 200), or a combination thereof. For example, the hypervisor 270 may manage the virtual components 210A-210n, 220A-220n, 230A-230n, and 240A-240n, either completely in software or by employing virtualization hardware assist functions provided by computer system 200. Multiple virtual machines (e.g., virtual machines 260A-260n), through their corresponding guest operating systems 205A-205n, may run concurrently under hypervisor 270 on computer system 200. In one embodiment, hypervisor 270 may include z/VM™ software program manufactured and sold by IBM® Corp., running on an IBM® System z mainframe computer. In this embodiment, computer system 200 may be a virtual machine provided by z/VM, and memory-addressed device 130 may be a Discontiguous Saved Segment ("DCSS") defined under z/VM and made available to the virtual machines 260A-260n. A DCSS refers to a segment of memory managed by z/VM that can be made available to one or multiple virtual machines at the same time. In addition, z/VM may hold only a single copy of the DCSS contents in real RAM 120 of computer system 200, even if the DCSS is made available to multiple virtual machines 260A-260n at the same time. Components that are directly accessible by CPU 110 for memory operations constitute the system memory address space of computer system 200 (e.g., RAM 120 and memory-addressed device 130).

In an exemplary embodiment, the hypervisor 270 includes logic for implementing the memory management processes described herein. The logic may be configured as part of the hypervisor 270 or as one or more applications executing in conjunction with the hypervisor 270 to perform the requisite functions. As shown in FIG. 2, the one or more applications are collectively referred to as page classifier/share logic 275 (also referred to as "logic"). In an exemplary embodiment, the logic 275 includes a reference counter ("R/C"), an operation tracker, and a timing component (none shown). The reference counter may be implemented as an unsigned number that is used to the status of system resources. For example, the reference counter may be incremented each time a guest has been given access to a given page (shared memory) and may be decremented when the resource is freed with respect to the guest. In an exemplary embodiment, a page will not be cleared as long it remains allocated to any user (e.g., guest), as tracked by the reference counter. Likewise, the page is cleared for re-use once it is determined via the reference counter that no users have access to the page. The operation tracker tracks the frequency or rate of operations performed for a particular page in memory over a defined period of time. This tracking may be implemented, e.g., using a binary tree structure in which changes to the page are hashed and stored as corresponding leaves in the structure. In this example, the frequency or rate of operations may be tracked by traversing the tree structure and determining the number of hops therein (depth of the tree). In an exemplary embodiment, the timing component tracks an amount of time in which a guest operating system has read/write access to a particular page. The timing component may be set to a pre-defined value (i.e., duration) upon the expiration of which write access permissions for a given guest operating system is downgraded to read-only access, as will be described further herein.

In an exemplary embodiment, the hypervisor 270, in conjunction with the page classifier/share logic 275, utilize a page classifier data structure 280, which may be implemented at least in part, e.g., by a binary tree, and is stored in the computer system 200 memory, such as one of the I/O devices 130, 140 of computer system 200, and updated as described herein. It will be understood that the page classifier data structure 280 may be stored in alternative locations, so long as the data structure 280 is accessible to the hypervisor 270.

In an exemplary embodiment, the page classifier data structure 280 may include various data fields used by the logic 275, such as PAGE_ROOT, PAGE_HASH_VALUES, and PAGE_CLASSIFICATION fields. In an exemplary embodiment, and as illustrated in FIG. 2, the PAGE_CLASSIFICATION fields further include a NEW_USE classifier, a TRACK_CHANGES classifier, and a NO_TRACK_CHANGES classifier. The PAGE_ROOT field represents the root node of the binary tree for a page and may be initialized as an empty page with zero content as described further herein. The PAGE_HASH_VALUES field represents a unique fingerprint derived using a hashing function on the content of a page. For example, the unique fingerprint may be created using various techniques, such as a hash algorithm that computes a normalized approximation of the page content.

As indicated above, the logic 275 classifies pages via the data structure 280 in accordance with suitability factors that determine whether the pages (as copies) are desirable or qualified candidates for sharing among virtual machines 260. In this effort, the timing component is set for a pre-defined time period and the logic 275 evaluates these suitability factors with respect to the page during its pendency in the virtual RAM 220, as measured or tracked via the timing component. The suitability analysis may apply factors that are known to affect the overall function of the virtual machine environment in terms of processing capabilities and bandwidth requirements. For example, suitability factors may include a current status of a page in memory (e.g., the number and/or frequency of changes made for a given page with respect to a defined elapsed time; the page has been, or is in the process of being cleared, from virtual memory; the page has exceeded a threshold number of changes and/or rates of change with respect to a pre-defined elapsed time). Since the frequency of page changes and/or rates of page changes would require more frequent comparisons in order to determine if these pages have a similar or common history with others, they would not likely be good candidates for sharing. In an exemplary embodiment, three classifiers are implemented via the classification scheme. The first classifier, NEW_USE, indicates that page has been cleared or is in the process of being cleared. The NEW_USE classifier assumes a cleared page will subsequently have a new use. The logic 275 is configured to track pages with this classifier in order to determine suitability for sharing the pages. The second classifier TRACK_CHANGES reflects pages that are write-protected or have write access for a limited amount of time. This classifier may be used to track changes to a memory page in a transactional way. The third classifier, NO_TRACK_CHANGES, reflects pages that have exceeded a defined number of changes or a defined rate of change. The logic 275 is configured to exclude these pages from change tracking, as they are considered unsuitable for sharing until they become cleared (e.g., NEW_USE). It will be understood that the number and type of classifiers are not limited to these three and that other types of classifiers may be defined for realizing the exemplary embodiments of the invention.

Other components (not shown) may be included in the computer system 200 of FIG. 2 in order to facilitate communications in a virtual machine environment. For example, applications executing on virtual machines 260 may request access to data or files through their corresponding guest operating systems 205 via, e.g., a memory/file manager (page fault handler), a device driver that copies data to and from specified locations on I/O devices (e.g., virtual devices 230 and/or 240), and a file system driver that acts as an interface between the memory/file manager and the device driver to coordinate communications between the I/O devices 230/240 and the virtual machines 260.

As indicated above, the memory management processes provide a way to conserve processing power and memory bandwidth in a virtual computer environment using a classification scheme that identifies pages suitable for sharing among concurrently running virtual machines, while minimizing the amount of searches of pages that are typically compared for matching content, and enabling the virtual machines to share pages according to the classification scheme. The exemplary memory management processes generate a unique fingerprint for candidate pages, gain a semantic knowledge from usage patterns of the pages (in which the semantic knowledge is distinct from the knowledge of the page content), categorize the pages according to a classification scheme derived from the semantic knowledge, and use the classification scheme to determine which of the pages are suitable for sharing. In one embodiment, this process may be optimized by a timing function used to aggregate multiple write operations.

Figure 3A:
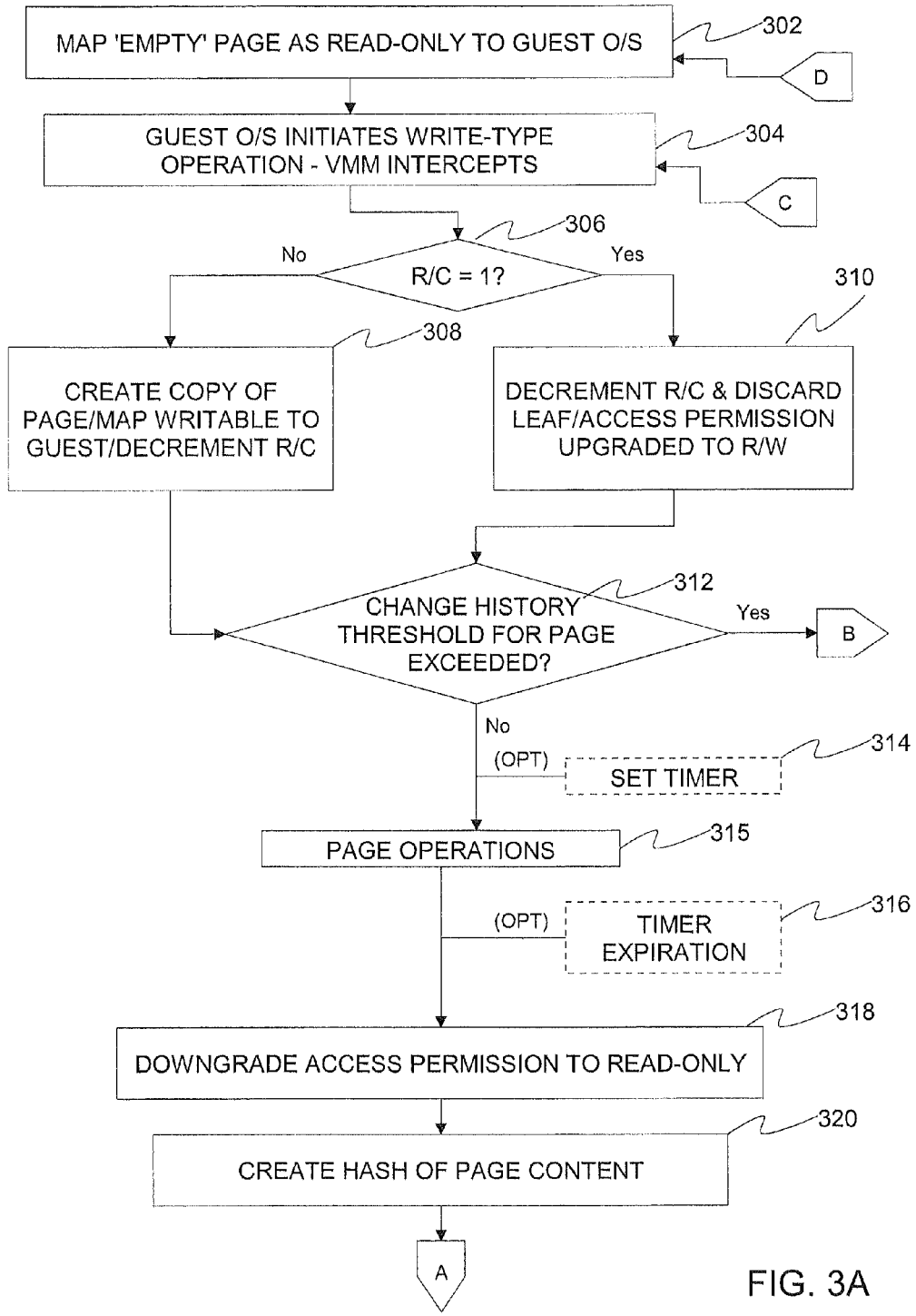
FIGS. 3A-3C are flow diagrams describing a process for implementing memory management processes in exemplary embodiments.
Figure 3B:
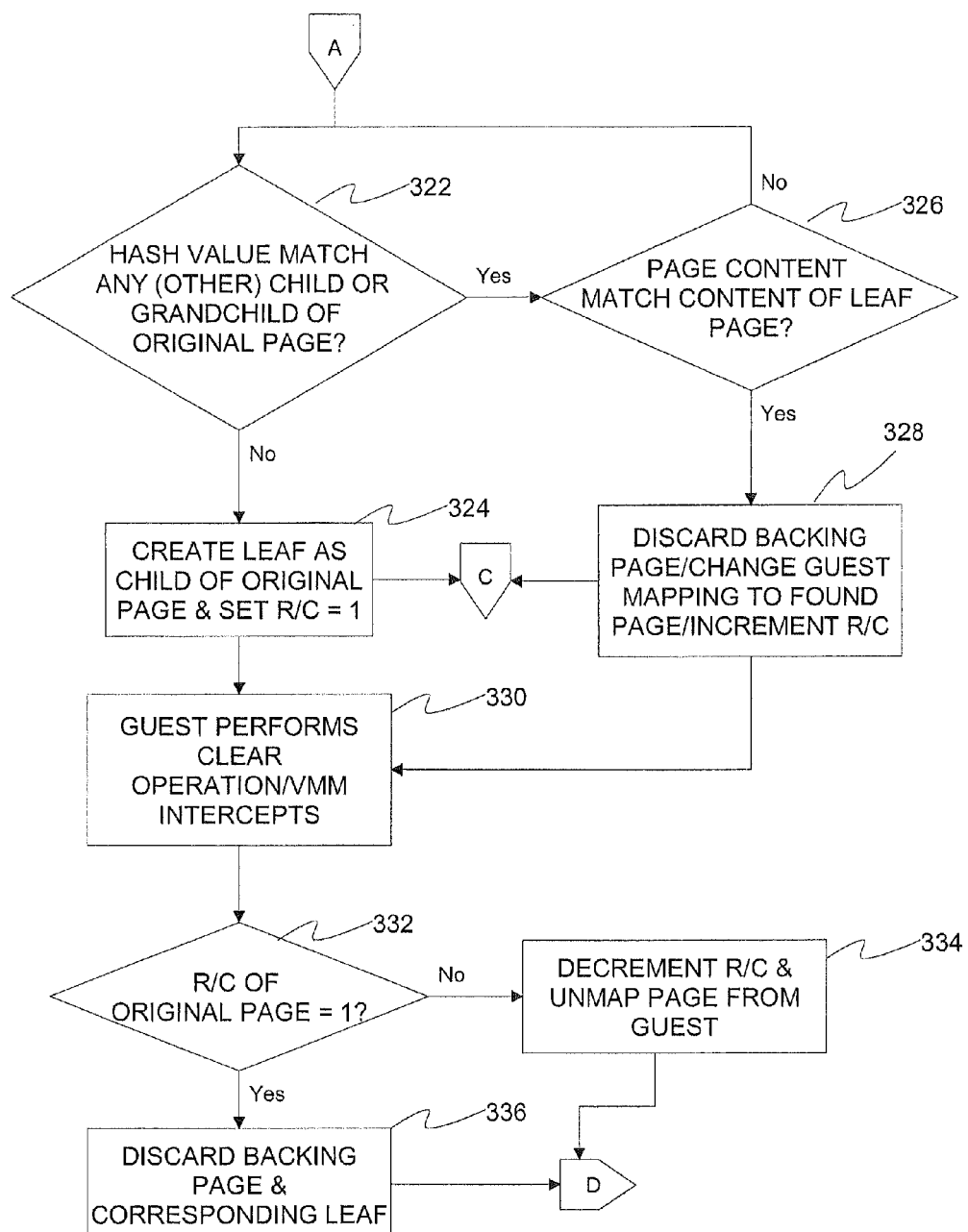
Figure 3C:
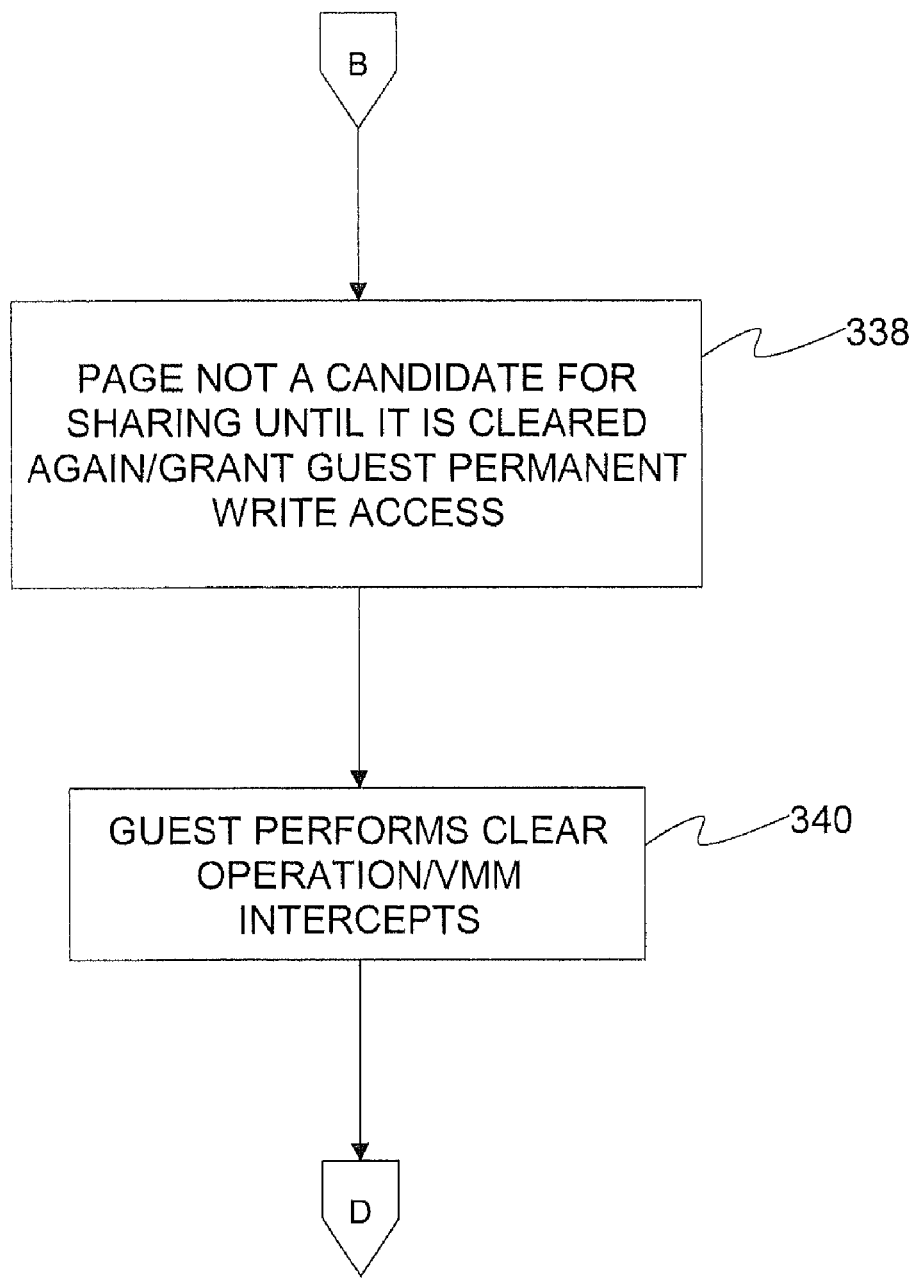

Turning now to FIGS. 3A-3C, an exemplary process for implementing the memory management functions will now be described. The processes described in FIGS. 3A-3C are directed to an embodiment that includes a virtual machine environment (e.g., the system shown in FIG. 2). However, it will be understood that the exemplary processes may also apply to a computer environment that employs virtual memory without the virtual machine implementations with minor adjustments (e.g., the function of guest O/Ss may be performed by application processes). In a virtual machine environment, requests by applications executing on guest operating systems to read, write, or otherwise access contents of files residing on I/O-based device 140 or memory-addressed device 130 are processed under the management of the hypervisor 270. The applications may reside, e.g., on one of the virtual devices of the computer system 200. Additionally, in an exemplary embodiment, requests to perform write-type operations are managed by the hypervisor 270 in conjunction with the logic 275 and the data structure 280. The processes described in FIGS. 3A-3C assume that initially, a guest operating system's virtual address space is cleared on startup, and the virtual address space of the guest is mapped to a single zero page (and page content is considered empty). As the system (e.g., bootloader) starts to populate memory, changes to the page are tracked, as described herein.

At step 302, the empty zero page is mapped 'read-only' to the guest (e.g., guest 205A). The empty zero page may be referred to as a "cleared page" upon the performance of a clearing operation and may also be referred to as an "original" page in order to distinguish it from copies of the page, as described further herein. At step 304, the guest 205A performs a write-type operation for the page, which is intercepted by the hypervisor 270 (since the guest 205A has been given 'read-only' access to the page). The hypervisor 270 is able to use semantic information to perform a copy-on-write operation. The hypervisor 270 knows about the usage of a page, e.g., via anonymous process memory or filed backed. For pages with a file backing, the hypervisor 270 knows the source file and the position of a subject page within that file. At step 306, the logic 275 determines if the reference count of the original ("requested") page is equal to "1." If not, the hypervisor 270 creates a copy of the page, maps the copied page as writable to the guest 205A, and decrements the reference counter at step 308. The reference counter is decremented to reflect that the guest 205A now has access to a copy of the page and so does not require continued access to the original page. The process then proceeds to step 312. However, if the reference count is equal to "1," the hypervisor 270 decrements the reference counter, discards a corresponding leaf in the page classifier data structure 280 for the page, and the access permission for the guest 205A is upgraded to 'read/write.' The reference counter is decremented from '1' to '0' in step 310 because the guest 205A is currently the only user with access to the page (i.e., reference counter=1 user). The corresponding leaf is discarded in step 310 because there is now only a single guest 205A with access to the page and such guest is the only user that can write to the page. Since no other guests are now sharing access to the page, the requesting guest 205A is given full read and write access permissions at step 310. The process proceeds to step 312, whereby the logic 275 determines if the past change activity of the page exceeds a pre-defined threshold. For example, the logic 275 checks the data structure 280 to determine the number of hops in the tree representing the page. In an exemplary embodiment, the past change activity is implemented and monitored via the operation tracker of the logic 275 described above in FIG. 2.

If the past change activity of the page exceeds the pre-defined threshold value, this means that the frequency or rate of changes to the page exceed a level that renders the page unsuitable as a candidate for sharing. In this event, the NO_TRACK_CHANGES classifier in the data structure 280 is updated accordingly. In this event, the process continues to FIG. 3C, as described further herein. However, if the past change activity of the page is equal to or less than the pre-defined threshold at step 312, this means the page is considered to be a candidate for sharing. The TRACK_CHANGES classifier of the data structure 280 is updated and the guest 205A may access and update the page at step 315. As shown in FIG. 3A, in an alternative embodiment, the logic 275 sets a timer for the page in order to track activities (i.e., operations) at step 314, as the guest 205A has been granted read/write permissions for the page. Thus, during the duration of the timer, the guest 205A may access and update the page at step 315.

In the alternative embodiment employing the timer function, at step 316, the timer expires, and the hypervisor 270 downgrades access permission of the guest 205A to 'read-only' at step 318, so that no additional changes may be made to the page. However, the exemplary processes may be performed without a timer function and, after the hypervisor 270 downgrades access permission of the guest 205A to 'read only' at step 318, at step 320, the logic 275 creates a hash of the page content and examines the page classifier data structure 280 for the original page (e.g., via the PAGE_ROOT field). In an exemplary embodiment, the logic 275 inserts the page content into the data structure 280 using the hash value of the page content as a key to the tree. The process continues to FIG. 3B.

At step 322, based upon the examination in step 320, the logic 275 determines if any child or grandchild of the original page has the same hash value as that created in step 320. If not, this means there is no other page in the data structure 280 that is currently being tracked and which has the same content as the page that was hashed in step 320. The logic 275 creates a leaf (e.g., child node) representing the page and its hash value and stores the leaf in the data structure 280 at step 324. The reference counter for the hashed page (new leaf) is set to "1," and the process returns to step 304, whereby the guest initiates another write-type operation, which is intercepted by the hypervisor 270.

Returning to step 322, if the logic 275 determines that a child or grandchild of the original page has the same hash value as the hash value created in step 320, the logic 275 determines if the page content of the matching child/grandchild in the tree is the same as the content of the current page at step 326. If not, this means that a collision has occurred (i.e., two different page contents have same hash value) and the process returns to step 322, whereby the logic 275 continues to examine other children/grandchildren in the tree of the data structure 280 for a match. Steps 322 and 326 may be implemented in a loop fashion until there exist no more remaining matches between the hash value of the current page and the hash values of pages in the data structure 280.

If the page content of the current page matches the page content of the leaf page in the data structure 280 (i.e., the same hash values and the same content) at step 326, this means an identical copy of the page content of the page which was hashed in step 320 has been found in the data structure 280 which, in turn, means that a duplicate copy of the content of the current page exists in the virtual RAM 220. Depending upon the particular implementation employed (e.g., a computer implementing virtual memory through address translation and paging used by applications (processes) running under an operating system, or a computer system implementing virtual memory in conjunction with virtual machines as "guests" of the virtual machine hosting environment), the matching page content in step 326 may refer to either two identical pages within one virtual machine (e.g., first and second virtual machines are the same) or two identical pages in one program/application (e.g., two identical pages in one instance of a process). In an exemplary embodiment, the logic 275 discards the current page (i.e., backing page), changes the guest mapping of the current page (i.e., the mapping which occurred in step 308) to the virtual address space of the found page (i.e., the page leaf discovered in the data structure 280), and increments the reference count at step 328. The process returns to step 304 whereby the guest 205A initiates another write-type operation, which is intercepted by the hypervisor 270.

In addition, in response to creating a leaf as a child of the original page (step 324) or, alternatively, in response to discarding the backing page and changing the guest mapping to the address of the found page (step 328), the guest 205A performs a 'clear' operation to reset the tracking data for the page at step 330, which operation is intercepted by the hypervisor 270.

At step 332, the logic 275 determines if the reference count of the original page is equal to "1." If not, the reference count is decremented, the page is unmapped from the guest virtual address space at step 334, and the process returns to step 302 whereby the "cleared" page is mapped as 'read-only' to the guest. As indicated above, all pages are initially derived from an empty zero page. Whenever a page is unused, this page is considered empty and its content is considered zero. This means that all unused/new pages are identical and can be shared. When a page becomes unused (as in step 334), it is marked empty again and the content is zeroed to avoid information transfer to a new user. Thus, if the reference count of the original page is not equal to "1" at step 332, the logic 275 discards the backing page and corresponding leaf at step 336, and the process returns to step 302 whereby the "cleared" page is mapped as 'read-only' to the guest. The clearing operation may be implemented, e.g., as a hypercall to the hypervisor 270.

Turning back to step 312 of FIG. 3A, if the change history threshold value for the page has been exceeded, the process proceeds to step 338 of FIG. 3C in which the page is marked as not a candidate for sharing until it is cleared again, and the hypervisor 270 grants the guest 205A permanent write access to the page. The page in this instance is considered excluded as a candidate for sharing until the page is cleared once again. Once the guest 205A has finished its operations with respect to the page, the guest 205A performs a 'clear' operation, which is intercepted by the hypervisor 270 at step 340, and the process returns to step 302 whereby the cleared page is mapped as 'read-only' to the guest (i.e., it is considered to have a new use).

Figure 4:
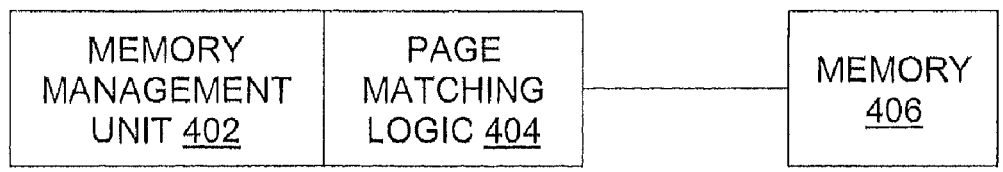
FIG. 4 is a block diagram illustrating a hardware implementation of the memory management processes in exemplary embodiments.
Figure 5:
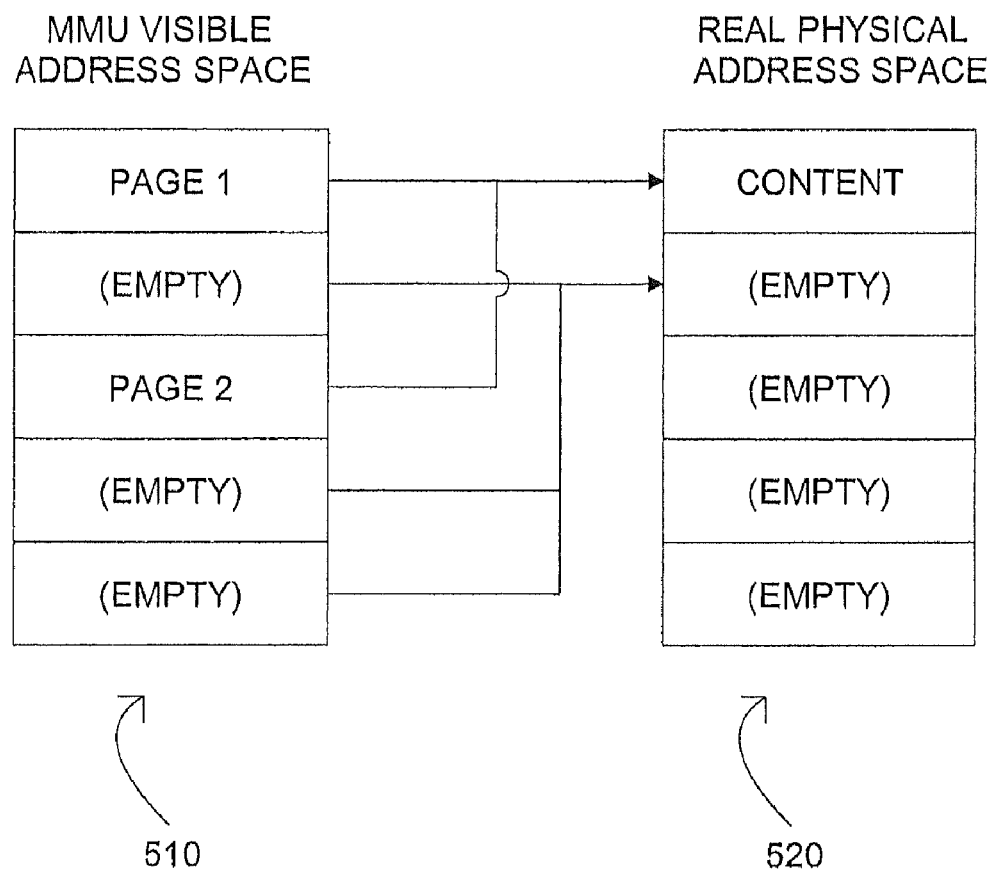
FIG. 5 is a diagram depicting memory components used in the hardware implementation of FIG. 4 in accordance with exemplary embodiments.

As indicated above, the memory management processes may be implemented in software (as described in FIGS. 3A-3C), hardware, or a combination thereof. Turning now to FIG. 4, an exemplary hardware-based implementation of the memory management processes will now be described. As shown in FIG. 4, one exemplary hardware implementation includes a memory management unit 402 (e.g., a memory controller), page matching logic 404 built into the memory management unit 402, and physical memory 406 that is in communication with the memory management unit 402. It will be understood that alternative hardware implementations may be employed, e.g., the page matching logic 404 may be a separate device residing between the MMU 402 and the memory 406; or the page matching logic 404 may be built into the memory 406 chip. FIG. 5 illustrates MMU visible address space 510 and real (physical) address space 520. The hardware implementation illustrated in FIG. 4 abstracts the real physical address space 520 into the address space 510 visible to the MMU 402 in a manner, e.g., similar to the process described in FIGS. 3A-3C in which the hypervisor 270 abstracts its physical address space to the one visible to the guest. Multiple pages visible to the MMU 402 (e.g., Pages 1 and 2 shown in MMU visible address space 510) may be merged to one real page (e.g., 'Content' page of real physical address space 520) as shown, e.g., in FIG. 5. The processes recited in FIGS. 3A-3C may be implemented in the hardware implementation, with or without the hypervisor 270.

As indicated above, FIG. 5 illustrates MMU visible address space 510 and real (physical) address space 520. In one exemplary embodiment, the hardware implementation described in FIG. 4 may generate a memory transaction by other means, then set up a timer, e.g., when a memory burst operation completes. In an alternative exemplary embodiment, the hardware implementation described in FIG. 4 may create a copy of the read-only shared source page triggered by a 'memory-write' operation, and then merge the data from the source page with the memory transfer on the fly into the target page.

Technical effects and benefits include the ability to conserve processing power and memory bandwidth in a virtual machine environment using a classification scheme that identifies pages suitable for sharing among concurrently running virtual machines, while minimizing the amount of searches of pages that are typically compared for matching content, and enabling the virtual machines to share pages according to the classification scheme.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each step of the flowchart illustrations and/or block diagrams, and combinations of steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
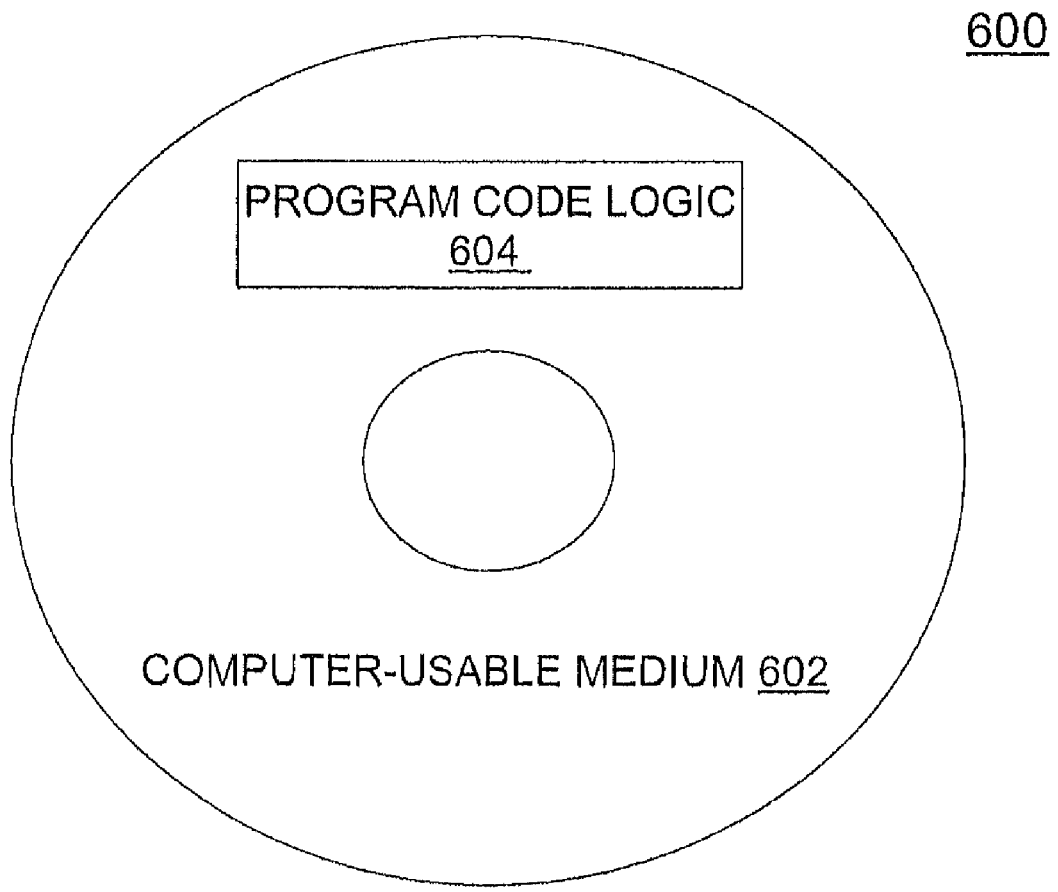
FIG. 6 is a diagram of a computer program product in accordance with exemplary embodiments.

As described above, embodiments can be embodied in the form of computer-implemented processes and apparatuses for practicing those processes. In exemplary embodiments, the invention is embodied in computer program code executed by one or more network elements. Embodiments include a computer program product 600 as depicted in FIG. 6 on a computer usable medium 602 with computer program code logic 604 containing instructions embodied in tangible media as an article of manufacture. Exemplary articles of manufacture for computer usable medium 602 may include floppy diskettes, CD-ROMs, hard drives, universal serial bus (USB) flash drives, or any other computer-readable storage medium, wherein, when the computer program code logic 604 is loaded into and executed by a computer, the computer becomes an apparatus for practicing the invention. Embodiments include computer program code logic 604, for example, whether stored in a storage medium, loaded into and/or executed by a computer, or transmitted over some transmission medium, such as over electrical wiring or cabling, through fiber optics, or via electromagnetic radiation, wherein, when the computer program code logic 604 is loaded into and executed by a computer, the computer becomes an apparatus for practicing the invention. When implemented on a general-purpose microprocessor, the computer program code logic 604 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each step in the flowchart or block diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for memory management of processors running in a virtual computer environment and of processes running in an operating system environment, the method comprising:
   identifying a usage pattern of a page in memory, the usage pattern identified by tracking operations conducted with respect to the page;
   designating the page as a candidate for sharing when the usage pattern reflects that a number of updates made to the page does not exceed a predefined threshold value, the candidate page allocated to at least one of a first process and a first virtual machine; and
   sharing access to the candidate page with at least one of a second process and a second virtual machine when content in the candidate page matches content of a page allocated to the at least one of a second process and second virtual machine by remapping an address space of the page allocated to the at least one of a second process and second virtual machine to an address space of the candidate page.

2. The method of claim 1, further comprising:
   creating a data structure for the candidate page, the data structure including nodes representing instances of each of the updates;
   setting a timing component for the page allocated to the at least one of a second process and second virtual machine;
   generating a hash value of content of the page allocated to the at least one of a second process and second virtual machine upon expiration of the timing component; and
   comparing the hash value of the page allocated to the at least one of a second process and second virtual machine with hash values generated for the updates to the candidate page in the data structure;
   wherein sharing access to the candidate page with the at least one of a second process and second virtual machine is implemented in response to an identified match between the hash value and content of the page allocated to the at least one of a second process and second virtual machine and one of the hash values and content generated for the updates to the candidate page.

3. The method of claim 2, wherein creating the data structure comprises:
   initializing the candidate page in the data structure as an empty root page having zero content, wherein children nodes of the empty root page specify the updates to the candidate page, the children nodes added to the data structure as hash values of page content reflecting the updates.

4. The method of claim 2, further comprising:
   downgrading access permission for the page allocated to the at least one of a second process and second virtual machine to read-only upon expiration of the timing component; and
   updating the data structure with results of the comparing while the at least one of a second process and second virtual machine is in a read-only state.

5. The method of claim 2, further comprising:
   discarding the updates made to the candidate page when operations on the candidate page and updated pages of the candidate page are completed and the page candidate and updated pages are no longer allocated to any process or virtual machine, the updates discarded in response to a clear operation;
   wherein the candidate page is classified for a new use in response to implementation of the clearing operation.

6. The method of claim 5, wherein discarding the updates made to the candidate and the updated pages include:
   discarding corresponding children nodes in the data structure; and
   unmapping the candidate page from corresponding at least one of processes and virtual machines.

7. The method of claim 1, further comprising:
   excluding the page as a candidate for sharing when the usage pattern reflecting a number of updates to the page exceeds the predefined threshold;
   providing the at least one of a first process and first virtual machine with write access to the excluded page; and
   upon completion of operations by the at least one of a first process and first virtual machine, clearing content of the excluded page;
   wherein cleared pages are classified for a new use in response to implementation of a clearing operation.

8. A system for memory management of processors running in a virtual computer environment and of processes running in an operating system environment, the system comprising:

a computer processor; and logic executable on the computer processor, the logic configured to implement a method, the method comprising:

identifying a usage pattern of a page in memory, the usage pattern identified by tracking operations conducted with respect to the page;

designating the page as a candidate for sharing when the usage pattern reflects that a number of updates made to the page does not exceed a predefined threshold value, the candidate page allocated to at least one of a first process and a first virtual machine; and sharing access to the candidate page with at least one of a second process and a second virtual machine when content in the candidate page matches content of a page allocated to the at least one of a second process and second virtual machine by remapping an address space of the page allocated to the at least one of a second process and second virtual machine to an address space of the candidate page.

9. The system of claim 8, wherein the method further comprises:

creating a data structure for the candidate page, the data structure including nodes representing instances of each of the updates;

setting a timing component for the page allocated to the at least one of a second process and second virtual machine;

generating a hash value of content of the page allocated to the at least one of a second process and second virtual machine upon expiration of the timing component; and comparing the hash value of the page allocated to the at least one of a second process and second virtual machine with hash values generated for the updates to the candidate page in the data structure;

wherein sharing access to the candidate page with the at least one of a second process and second virtual machine is implemented in response to an identified match between the hash value and content of the page allocated to the at least one of a second process and second virtual machine and one of the hash values and content generated for the updates to the candidate page.

10. The system of claim 9, wherein creating the data structure comprises:

initializing the candidate page in the data structure as an empty root page having zero content, wherein children nodes of the empty root page specify the updates to the candidate page, the children nodes added to the data structure as hash values of page content reflecting the updates.

11. The system of claim 9, wherein the method further comprises:

downgrading access permission for the page allocated to the at least one of a second process and second virtual machine to read-only upon expiration of the timing component; and updating the data structure with results of the comparing while the at least one of a second process and second virtual machine is in a read-only state.

12. The system of claim 9, wherein the method further comprises:

discarding the updates made to the candidate page when operations on the candidate page and updated pages of the candidate page are completed and the page candidate and updated pages are no longer allocated to any process or virtual machine, the updates discarded in response to a clear operation;

wherein the candidate page is classified for a new use in response to implementation of the clearing operation.

13. The system of claim 12, wherein discarding the updates made to the candidate and the updated pages include:

discarding corresponding children nodes in the data structure; and unmapping the candidate page from corresponding processes or virtual machines.

14. The system of claim 9, wherein the method further comprises:

excluding the page as a candidate for sharing when the usage pattern reflecting a number of updates to the page exceeds the predefined threshold;

providing the at least one of a first process and first virtual machine with write access to the excluded page; and upon completion of operations by the at least one of a first process and first virtual machine, clearing content of the excluded page;

wherein cleared pages are classified for a new use in response to implementation of a clearing operation.

15. A computer program product for memory management of processors running in a virtual computer environment and processes running in an operating system environment, the computer program product comprising a non-transitory computer-readable storage medium having computer program code embodied thereon, which when executed by a computer, cause the computer to implement a method, the method comprising:

identifying a usage pattern of a page in memory, the usage pattern identified by tracking operations conducted with respect to the page;

designating the page as a candidate for sharing when the usage pattern reflects that a number of updates made to the page does not exceed a predefined threshold value, the candidate page allocated to at least one of a first process and a first virtual machine; and sharing access to the candidate page with at least one of a second process and a second virtual machine when content in the candidate page matches content of a page allocated to the at least one of a second process and second virtual machine by remapping an address space of the page allocated to the at least one of a second process and second virtual machine to an address space of the candidate page.

16. The computer program product of claim 15, wherein the method further comprises:

creating a data structure for the candidate page, the data structure including nodes representing instances of each of the updates;

setting a timing component for the page allocated to the at least one of a second process and second virtual machine;

generating a hash value of content of the page allocated to the at least one of a second process and second virtual machine upon expiration of the timing component; and comparing the hash value of the page allocated to the at least one of a second process and second virtual machine with hash values generated for the updates to the candidate page in the data structure;

wherein sharing access to the candidate page with the at least one of a second process and second virtual machine is implemented in response to an identified match between the hash value and content of the page allocated to the at least one of a second process and second virtual machine and one of the hash values and content generated for the updates to the candidate page.

17. The computer program product of claim 16, wherein creating the data structure comprises:
   initializing the candidate page in the data structure as an empty root page having zero content, wherein children nodes of the empty root page specify the updates to the candidate page, the children nodes added to the data structure as hash values of page content reflecting the updates.

18. The computer program product of claim 16, wherein the method further comprising:
   downgrading access permission for the page allocated to the at least one of a second process and second virtual machine to read-only upon expiration of the timing component; and
   updating the data structure with results of the comparing while the at least one of a second process and second virtual machine is in a read-only state.

19. The computer program product of claim 16, wherein the method further comprises:
   discarding the updates made to the candidate page when operations on the candidate page and updated pages of the candidate page are completed and the page candidate and updated pages are no longer allocated to any process or virtual machine, the updates discarded in response to a clear operation;
   wherein the candidate page is classified for a new use in response to implementation of the clearing operation.

20. The computer program product of claim 19, wherein discarding the updates made to the candidate and the updated pages include:
   discarding corresponding children nodes in the data structure; and
   unmapping the candidate page from corresponding processes or virtual machines.

21. The computer program product of claim 15, wherein the method further comprises:
   excluding the page as a candidate for sharing when the usage pattern reflecting a number of updates to the page exceeds the predefined threshold;
   providing the at least one of a first process and first virtual machine with write access to the excluded page; and
   upon completion of operations by the at least one of a first process and first virtual machine, clearing content of the excluded page;
   wherein cleared pages are classified for a new use in response to implementation of a clearing operation.

* * * * *